Oct. 29, 1957   E. R. ATKINS, JR., ET AL   2,811,649
NEUTRON LOGGING OF WELL BORES
Filed July 18, 1952
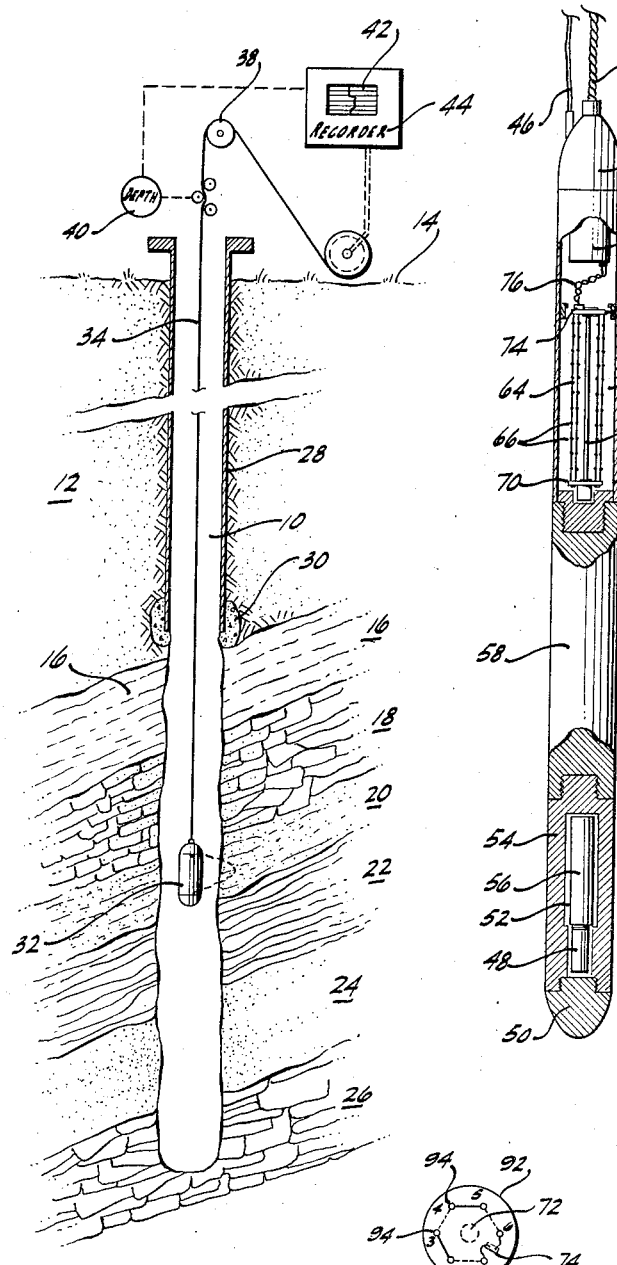
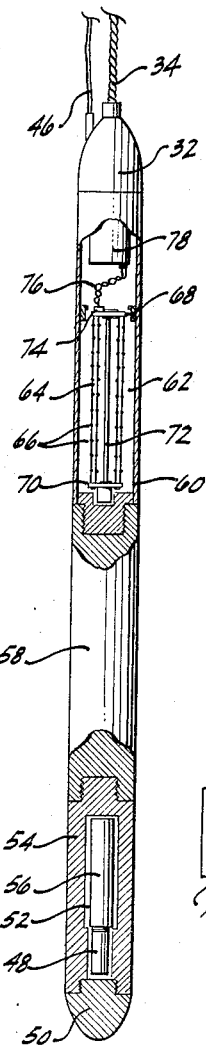
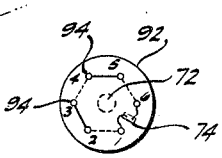
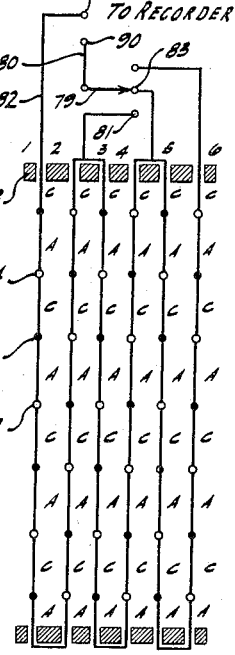
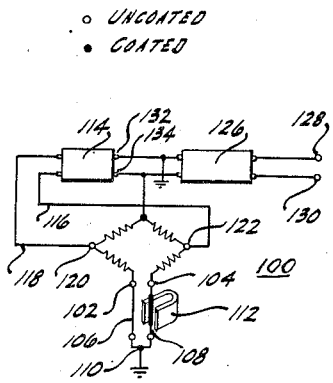
INVENTORS.
EARLE R. ATKINS, JR.
PAUL G. NAHIN,
BY
AGENT

United States Patent Office 2,811,649
Patented Oct. 29, 1957

2,811,649

NEUTRON LOGGING OF WELL BORES

Earle R. Atkins, Jr., Whittier, and Paul G. Nahin, Brea, Calif., assignors to Union Oil Company of California, Los Angeles, Calif., a corporation of California Application July 18, 1952, Serial No. 299,724

4 Claims. (Cl. 250—83.1)

This invention relates to the characterizing of formations of earth strata penetrated by a borehole into the earth's crust and particularly relates to the logging of such formations by determining the degree to which neutrons are slowed or thermalized therein and returned to the borehole.

The characterization of strata penetrated by a well bore yields important information relating to the geologic age and physical nature of the strata. Although such information is highly important for a number of reasons, it is particularly pertinent in the recovery of minerals from the earth's crust such as the production of sulfur and hydrocarbon liquids and gases and water from such subsurface strata.

Logging methods in general include several types of so-called radioactive logs. One involves the measurement of gamma ray radiation which is generated by the natural radioactive decay of radioactive minerals present in the strata. This natural radioactivity results primarily from the decay of the uranium, thorium, and actinium families, and potassium. An other type involves the determination of gamma ray radiation induced in the strata penetrated by the borehole following the irradiation of such strata by the passage of a neutron source through the borehole. This latter method yields other information relative to the geologic strata and is termed generally a neutron log.

There is another type of neutron log in which the strata are characterized as a function of the amounts of fast neutrons liberated from the neutron source and which are slowed or thermalized by the formation and returned into the borehole. Conventionally in this latter method in which reflected neutrons are detected, a boron-coated Geiger-Mueller counter or a boron-containing ionization chamber is passed through the borehole together with the neutron source. The reflected thermalized neutrons are detected and their intensity measured by the Geiger-Mueller counter or ionization chamber in which a gas filling or an internal coating is employed. This coating readily absorbs the reflected neutrons and generates in the absorption a radiation causing an ionization within the detector, which is measured by means well-known to those skilled in the art of radiation measurement.

Neutron logging is not entirely satisfactory due to the fact that the counter or ionization chamber is simultaneously sensitive to both the induced gamma ray radiation of the penetrated formations as well as to the normal so-called background or natural radiation. Thus any radioactive log of a borehole using this method must be corrected for these background radiations in order to determine the effect of the reflected neutrons or induced gamma rays. Since the normal background radiation is usually irregularly variable, the corrected log is at best only an approximation and the data are ordinarily subject to considerable error.

The present invention therefore is directed to an improved process and apparatus for the reflected-neutron logging of well bores in which only the absorbed reflected neutrons affect the detector, and the normal background gamma ray radiation and the induced radiation do not contribute to or confuse the reflected-neutron detection.

It is a primary object of this invention to provide an improved reflected-neutron logging system for characterizing the strata in the earth's crust penetrated by a well bore.

It is an additional object to provide an improved reflected-neutron detection system which is unaffected by other radiations and which is highly sensitive only to slow or thermal neutrons reflected back into the borehole by the surrounding strata.

A more specific object of this invention is to provide a system for the detection of reflected neutrons which employs a temperature sensitive element which is coated or otherwise surrounded by a material which is fissionable in a slow neutron field and absorbs the reflected neutrons liberating thermal energy.

Other objects and advantages of this invention will become apparent to those skilled in the art as the description thereof proceeds.

Briefly, the present invention comprises an improved neutron logging system in which a neutron source, such as the classic radium-beryllium or other source of neutrons, is passed through a borehole penetrating a portion of the earth's crust together with an improved reflected-neutron detection means whereby the intensity of neutrons, which are slowed or thermalized and returned at least in part to the borehole, is measured in accordance with the degree of thermal energy released upon the absorption of such reflected neutrons in a highly neutron-absorbent medium.

The element boron, particularly the boron isotope having an atomic weight of 10, exhibits strong absorption properties for slow neutrons having an energy of about one fortieth electron volt, which is an energy characteristic of the neutrons reflected by earth formations and particularly by those strata containing hydrogen in the form of hydrocarbons or water or other materials. The reaction resulting from the absorption of such a slow neutron in elemental boron $B^{10}$ is written as follows:

$$_5B^{10} + _0n^1 \rightarrow _3Li^7 + _2He^4 + 2.5 \text{ m. e. v.}$$

The alpha particle, or helium nucleus, liberated shares with the lithium product and the gamma rays of the radioactive transformation between about 5 and 8 million electron volts (m. e. v.) of neutron binding energy released through the fission of the boron. Of this energy, 2.5 m. e. v. is manifest as the kinetic energy of the fission ions and is dissipated to produce thermal energy which is detachable according to this invention by means of temperature sensitive devices such as a thermocouple or thermopile.

Boron $B^{10}$ is representative of the class of materials which are fissionable in a slow or thermal neutron field and which liberate thermal energy upon neutron capture and fission and the slowing down of the fission products.

Since the mass of fissionable material employed is very small, the thermal energy liberated is relatively small and its effect is preferably multiplied to accurately measurable levels by employing a plurality of thermocouple junctions connected in additive series forming a compound thermopile. Every other junction in this thermopile is enclosed in or is in contact with a mass of boron or other fissionable material which characteristically absorbs the slow or thermal neutrons reflected by the earth formations being logged. The absorption of reflected and thermalized neutrons in the boron coating raises the temperature of the boron masses contacting the alternate thermocouple junctions in an amount proportional to the number of absorbed neutrons, e. g., in proportion to the slow neutron flux. The remaining uncoated junctions of relatively low slow neutron capture cross section are unaffected by the slow neutrons or other types of radiation. Furthermore, the coating of the alternate junctions with boron and the leaving of the other junctions uncoated renders the thermopile insensitive to the ambient thermal effects which are commonly encountered in boreholes drilled into the earth's crust.

Restated, the compound thermopile slow neutron detection means according to this invention is composed of a plurality of boron coated thermocouple junctions connected in additive series together with a plurality of uncoated thermocouple junctions connected between and in series opposition with each adjacent pair of coated junctions. The compound thermopile thus formed is therefore totally insensitive to normal ambient thermal changes in the medium surrounding the thermopile. However, in a slow neutron field, absorption of neutrons occurs in every other thermocouple junction in the boron coating and because these junctions are connected in additive series, the electromotive force generated by each coated junction is cumulative and produces an electromotive force which is large enough to be readily detected and accurately measured by potentiometric means commonly employed in the measurement of temperatures with thermocouples.

Naturally occurring compounds of boron contain this element as a mixture of its isotopes to the extent that about 19% is boron of atomic weight 10 or $B^{10}$ and about 81% is boron of atomic weight 11 or $B^{11}$. The $B^{10}$ isotope has the greater slow neutron capture cross section and although the boron of commerce prepared from its naturally occurring compounds is applicable in this invention, preferably "enriched boron" presently available and containing about 96% $B^{10}$ is employed because a fivefold increase in sensitivity to slow neutrons is obtained.

The use of a boron coating or other coating material having absorption properties for slow neutrons may be applied to other temperature sensitive devices for the measurement of reflected neutrons in the neutron logging system of this invention. For example, it is known that a wire under tension and through which an alternating current is passed will physically oscillate, if a uniform magnetic field surrounds the wire, at the characteristic vibrational frequency of the wire. This frequency is determined by the physical nature of the wire and the tension applied to it. The tension on the wire will vary with its temperature due to the natural thermal expansion and contraction effects and thus temperature changes will effect its characteristic vibrational frequency.

The provision in such a device of a slow neutron absorbent coating renders the vibrating wire sensitive to temperature effects of slow neutron absorption in boron and when the wire is appropriately connected in a bridge circuit having means provided for maintaining an alternating current flow therethrough having the same frequency as the characteristic vibrational frequency of the wire under the conditions existing, an oscillation current is generated whose frequency is characteristic of the wire temperature which in turn is directly proportional to the slow neutron intensity. Thus, frequency measurement devices applied to the oscillator output provide a direct reading of the intensity of the slow neutron field which in this invention permits a highly accurate measurement of the intensity of neutrons reflected from subsurface formations. This constitutes a preferred form of this invention.

It will be obvious from the subsequent description that the principles of this invention discussed generally above may be applied with suitable modifications to other temperature sensitive mechanisms such as the partial conductors, resistance thermometers, etc. as employed in bolometers rendering them sensitive to slow neutron radiation and permitting their use in neutron-neutron logging of boreholes.

The present invention will be more clearly understood by reference to the accompanying drawings in which:

Figure 1 is a schematic cross-sectional view of a well bore indicating the penetrated strata and the means for carrying out the process of this invention, Figure 2 is an elevation view in partial cross section of the logging device of this invention which is passed through the borehole and in which one modification of slow neutron detector according to this invention is employed, Figure 3 shows a detailed schematic view of the compound boron-coated thermopile of this invention, Figure 4 is a transverse view of the apparatus shown in Figure 3, and Figure 5 is a schematic view of the mechanism employed in the boron coated vibrating wire device modified according to the principles of this invention and adapted to generate an alternating current having a frequency which is proportional to the intensity of the reflected neutrons.

Referring now more particularly to Figure 1, well bore 10 penetrates earth's crust 12 from the earth's surface 14 and passes through a plurality of subsurface strata 16, 18, 20, 22, 24, 26, etc. Generally, the upper unconsolidated strata are supported by casing 28 provided with water shutoff 30. The neutron source and slow neutron detector are carried in device 32 which is suspended in the borehole and movable therethrough by means of suspension cable 34. Cable 34 is wound and unwound from drum 36 and passes over sheave 38. The depth of logging device 32 with reference to seal level or the local surface level 14 is measured by depth gauge 40 which in turn actuates the movement of chart 42 in automatic temperature recorder 44. The temperature indication generated in logging device 32 is passed either through a separate cable 46 as shown in Figure 2 or through conductors in suspension cable 34 from logging device 32 to the surface and is recorded in terms of temperature or slow neutron field intensity on chart 42 of temperature recorder 44.

The logging of the penetrated strata referred to above is effected by passing the logging device 32 at a relatively slow rate through the borehole starting either from the top or the bottom and at speeds ranging from about 200 to about 3000 feet per hour. Neutrons are generated in and radiated from a neutron source positioned in the body of logging device 32. These neutrons are slowed or thermalized in the penetrated strata and to some extent are returned into the borehole where they repenetrate the body of logging device 32 and actuate the slow neutron detecting means referred to above. A continuous recording of the temperature, frequency, resistance, or other effects generated by the detecting means is obtained in recorder 44 and may be plotted directly as a function of the position of the logging device 32 within borehole 10.

Referring now more particularly to Figure 2, an elevation view in partial cross section of one modification of logging device is shown. The device is provided with a fluid-tight housing and suspension cable 34 and a separate cable 46 containing the necessary electrical conductors connecting the detecting device in logging instrument 32 with the recording devices maintained at the surface.

The housing 32 is provided at its lowermost portion with neutron source 48 which may comprise an aluminum can containing a radium-beryllium neutron source. Other neutron sources such as antimony 124-beryllium, or even small, intermediate, or fast homogeneous neutron piles (U or Pu fissions reactors) may be substituted. A removable lower portion such as element 50 provides access to chamber 52 containing the neutron source. The shell 54 surrounding the neutron source is preferably of a material readily penetrated by fast neutrons and yet mechanically strong and resistant to mechanical shock and chemical corrosion. The various aluminum alloys are suitable materials of construction for shell 54. Other materials such as steel may be used and is preferable due to its relatively good resistance to brine corrosion as encountered in earth bores.

Also disposed within chamber 52 is neutron shield 56. In Figure 2 this shield takes the form of a slug positioned within chamber 52 between the neutron source 48 and the neutron detecting device referred to below. This shield effectively isolates the neutron source and the detection device from the direct passage of neutrons therebetween. The shield is preferably constructed of beryllium oxide or high-melting wax, but may be also constructed of such materials as lead, boron-steel, cadmium, etc. or a combination of these.

To isolate further the neutron source from the detecting device isolating section or bar 58 constructed of lead or iron, or high boron or cadmium steel connects shell 54 containing the neutron source with shell 60 containing the detecting device or devices. The material from which shell 60 is fabricated is preferably aluminum or aluminum alloys or other material which permits the ready transfer of slow neutrons such as mild steel.

Shell 60 surrounds detection chamber 62 which contains the modified thermopile slow neutron detection device referred to above. This device consists of a relatively long conductor 64 containing spaced thermocouples constructed from a plurality of serially connected substantially equal lengths of thermocouple wire. A plurality of thermocouple junctions 66 composed of the dissimilar metals at those points which each individual length is connected to the adjacent length of dissimilar metal are hereby provided.

This thermopile is extended between retainer discs 68 and 70 composed of insulating material. The discs are kept separate by space bar 72 or other suitable means. The thermopile runs longitudinally back and forth between the peripheries of discs 68 and 70 forming a cagelike system of wires placing the thermocouple junctions on an imaginary cylindrical surface concentric within but electrically insulated from shell 60. The two ends of the thermopile are brought out to terminal strip 74. To this terminal strip conductors 76 are connected from amplifying, detection, or other means 78 contained within the body of logging device 32. Electrical cable 46 connects the surface equipment by means not shown to device 78 or directly to electrical conductors 76.

In Figure 3 is shown a schematic diagram of the compound thermopile referred to in Figure 2 in which a single conductor prepared from alternately disposed lengths of dissimilar metallic wire is supported back and forth between discs 68 and 70 and provided with copper thermocouple leads 80 and 82 connected to the terminals 1 and 6 of the thermopile. For example, a thermopile composed of alternate chromel (C) and alumel (A) thermocouple elements in series consisting of 42 thermocouple junctions arranged in 6 rows of 7 junctions each. The open circles indicate uncoated junctions whereas the filled circles in Figure 3 indicate junctions coated with boron or other slow neutron absorbing material.

In any transverse plane through the device of Figure 3 an equal number of coated and uncoated junctions appear. When an even number of rows each having an odd number of junctions are employed, an effective compensation is realized for the effect of temperature gradients existing in a plane normal to the axis of logging device 32. The fact that all junctions are exposed to the ambient temperature makes the thermopile insensitive to it. The thermoelectric currents generated by the coated and uncoated junctions in response to the normal temperature gradients in the surroundings neutralize each other; that is, the thermoelectric activity of thermocouple 84, for example, is exactly neutralized by the thermoelectric activity of thermocouple 86, but due to the fact that only every other thermocouple junction such as 84 and 85, etc. is coated with boron or other suitable material, the temperature of these junctions and at all the other coated junctions will be higher than the temperature at uncoated junctions 86 and 87 due to neutron absorption.

The thermoelectric voltages generated by the alternate coated junctions are cumulative while the thermoelectric voltages generated by each coated junction due to the ambient temperature are exactly neutralized by the series opposition connection thereof with the uncoated junctions. Thus, in the device shown in Figure 3 the thermoelectric voltage appearing at terminals 88 and 90 is equal to 21 times the average thermoelectric voltage generated by each natural boron coated thermocouple such as thermocouple 84 due solely to the absorption of slow neutrons and 90 times the average voltage when enriched boron $B^{10}$ coating is used. Switch 79 and taps 81, 83, and 85 permit the use of all or only a portion of the thermopile depending upon the sensitivity desired.

Calibration of a thermopile such as that shown in Figures 2 and 3 in slow neutron fields of known intensity permits an immediate correlation of thermoelectric voltage with reflected slow neutron field intensity in the subsurface. The use of multiple thermocouple elements such as in the thermopile discussed above permits the generation of substantial and accurately measurable thermoelectric voltages permitting accurate determinations of slow neutron field intensity which are free of induced or natural background gamma ray contribution.

Referring to Figure 4, a transverse view of disc 68 shown in Figures 2 and 3 is given indicating terminal strip 74 of Figure 2 and the disposition of the thermopile around the periphery 92 of disc 68. Small holes 94 are conveniently drilled in the disc to permit stringing the compound thermopile element back and forth between the two discs thereby disposing the thermocouple elements on an imaginary cylindrical surface concentric within shell 60 shown in Figure 2.

In Figure 5 is shown a schematic diagram for the application of the principles of this invention to another temperature sensitive means other than thermocouples. In Figure 5 Wheatstone bridge circuit 100 is shown provided with the usual 4 series connected resistances. Between terminals 102 and 104 are connected 2 wires 106 and 108. The common terminal 110 of these wires is grounded and one of the wires, 108, is coated with boron or other material which absorbs slow neutrons, wire 106 is uncoated. Wire 108 is subjected to a magnetic field by magnet 112 and is also maintained under tension.

Wire 108 has a characteristic vibrational frequency which varies with the tension applied thereto. The temperature of the wire 108 changes with the absorption of slow neutrons and with changes in temperature the physical expansion or contraction resulting alters the tension of the wire and thereby changes its fundamental frequency of oscillation. The thermal effects of the ambient temperature equally affect wires 106 and 108.

An oscillating voltage picked up from the vibrating wire 108 in the bridge circuit 100 is amplified by feedback amplifier 114 and is applied through conductors 116 and 118 to input terminals 120 and 122 of the Wheatstone bridge 100. This returns an alternating electrical current at the same frequency through the Wheatstone bridge and through wires 106 and 108 causing wire 108, due to the presence of the magnetic field provided by magnet 12, to maintain the vibration or oscillation. Connected to output terminals 110 and 124 is output amplifier 126 which amplifies the oscillation produced by the vibrating wire and produces an alternating current output voltage at output terminals 128 and 130. The frequency of this oscillation is directly proportional to the tension of wire 108 which in turn is inversely proportional to the temperature of wire 108. The temperature in turn is proportional to the slow neutron field to which wire 108 is exposed. Input terminals 132 and 134 of feedback amplifier 114 are also connected to output terminals 124 and 110 of the Wheatstone bridge oscillator. Feedback amplifier 114 therefore functions to amplify the Wheatstone bridge oscillator circuit output somewhat and return part of this energy to the oscillator to maintain the vibration of coated wire 108.

The alternating current voltage appearing at output terminals 128 and 130 may be transmitted from the body of logging device 32 through a cable 46 as shown in Figure 2 to a recorder instrument such as 44 shown in Figure 1 where a recording of the oscillation frequency may be made in terms of slow neutron field intensity as these values vary with the location of logging device 32 in the borehole.

*Example I*

A compound thermopile designed for detecting slow neutron fields accurately is constructed of alternate chromel and alumel thermocouple wires having a total of 220 junctions. These are disposed in 20 parallel rows of 11 junctions per row. Alternate junctions are coated with 1.5 grams natural boron each. The typical variation of slow neutron (about 1/40 e. v.) field produces a temperature difference of between about 0.01° C. and about 1.0° C. and the thermoelectric voltage at the terminals of the compound thermopile varies between 44 and 4,400 microvolts.

*Example II*

In the instrument of Example I, the natural boron junction coating is substituted with "enriched boron" or $B^{10}$ having an appreciably greater slow neutron capture cross section. The maximum number of coated junctions is effectively increased from 110 to 578 and the terminal thermoelectric voltage variation is between about 0.23 and about 23 millivolts.

It should be understood that the maximum number of junctions or other temperature sensitive elements referred to above which may be employed may be as high as 1000 or higher and with enriched boron $B^{10}$ coatings effectively about 5000 elements are obtained. These large numbers are sometimes required when fast neutron sources of relatively low intensity are employed or formations are encountered which do not effectively slow or thermalize such fast neutrons. Such formations contain little combined hydrogen and contain combined oxygen in forms such as silica sand and limestone.

Decreased numbers of elements are permitted or increased thermoelectric voltages or other electric changes are obtained when the more intense neutron sources are employed such as, for example, small volume intermediate or fast homogeneous neutron piles referred to above.

Devices for detecting, measuring and recording such voltages as are generated by the compound thermopile of this invention or for measuring frequency of oscillation or for thermal changes in electrical resistance are well-known in the art, such as the various instruments employing potentiometric means for voltage measurement, etc. and will not be discussed further. The recording instruments are also well-known and available commercially.

Although chromel-alumel thermocouple junctions are referred to above, the invention is not to be understood as limited solely to such junctions since the other well-known types of junctions as copper-constantan, chromel-constantan, iron-constantan, platinum rhodium alloys-platinum and others. The chromel-constantan couples give voltages of about 71 microvolts per ° C. giving additional sensitivity. In any case, alternate junctions in the thermopile are coated with boron, enriched boron $B^{10}$, or other absorbing medium for thermal or slow neutrons.

Boron, both natural mixtures of $B^{10}$ and $B^{11}$ and enriched boron $B^{10}$, have been discussed above as the coating or slow neutron absorbing material to be applied to the alternate thermocouple junctions for well bore logging. Other materials may be substituted provided they are fissionable by capture of thermal or slow neutrons. Such materials include uranium 233 and uranium 235, plutonium, and others and can be used, when made available to the public, in the reflected neutron logging of well bores as described above.

A particular embodiment of the present invention has been hereinabove described in considerable detail by way of illustration. It should be understood that various modifications and adaptations thereof may be made by those skilled in the art without departing from the spirit and scope of the invention as set forth in the appended claims.

We claim:

1. An apparatus for neutron-neutron logging of well bores into the earth's crust which comprises an elongated fluid-tight housing, a suspension means therefor, means for passing said housing through an earth bore, means for measuring the depth therein of said housing, a source of fast neutrons contained within said housing, a slow neutron detector within said housing and isolated from said source, said detector comprising a Wheatstone bridge oscillator including a vibrating wire element in contact with a material having a high capture cross section for slow neutrons, said wire element being connected in series with one of the resistances of said bridge, means for maintaining said wire under tension, means for maintaining a direct current magnetic field surrounding said wire element, the temperature and tension and frequency of oscillation of said wire element being variable with the slow neutron flux existing within the earth bore, and a recorder instrument connected to said means for measuring the depth of said housing within said bore and also connected to said Wheatstone bridge oscillator and adapted thereby to record the variable frequency of oscillation as a measure of slow neutron flux within said bore as a function of depth therein.

2. An apparatus according to claim 1 wherein said vibrating wire element is provided with a coating of a material which is fissionable upon slow neutron capture.

3. An apparatus according to claim 2 wherein said material contains boron.

4. An apparatus according to claim 3 wherein said boron is enriched boron containing more than the normal concentration of boron of atom weight 10.

References Cited in the file of this patent

UNITED STATES PATENTS

| | | |
|---|---|---|
| 2,480,674 | Russell | Aug. 30, 1949 |
| 2,558,919 | Zinn | July 3, 1951 |
| 2,564,626 | MacMahon et al. | Aug. 14, 1951 |
| 2,579,994 | Zinn | Dec. 25, 1951 |
| 2,677,772 | Moon | May 4, 1954 |
| 2,689,918 | Youmans | Sept. 21, 1954 |
| 2,712,081 | Fearon et al. | June 28, 1955 |